(12) United States Patent
Oberhofer et al.

(10) Patent No.: US 11,687,828 B2
(45) Date of Patent: Jun. 27, 2023

(54) AUTO-TUNING OF COMPARISON FUNCTIONS

(71) Applicant: INTERNATIONAL BUSINESS MACHINES CORPORATION, Armonk, NY (US)

(72) Inventors: Martin Oberhofer, Sindelfingen (DE); Sergio Luis Olvera Gutierrez, Austin, TX (US); Soma Shekar Naganna, Bangalore (IN); Abhishek Seth, Deoband (IN); James Albert O'Neill, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 16/599,427

(22) Filed: Oct. 11, 2019

(65) Prior Publication Data
US 2021/0110295 A1 Apr. 15, 2021

(51) Int. Cl.
*H04L 29/06* (2006.01)
*G06N 20/00* (2019.01)
(Continued)

(52) U.S. Cl.
CPC ............... *G06N 20/00* (2019.01); *G06N 5/04* (2013.01); *H04L 9/30* (2013.01)

(58) Field of Classification Search
CPC .......... G06N 20/00; G06N 5/04; G06N 5/003; G06N 3/08; H04L 9/30; H04L 9/14
See application file for complete search history.

(56) References Cited

U.S. PATENT DOCUMENTS

2009/0089630 A1 4/2009 Goldenberg
2009/0099902 A1* 4/2009 Chatter .............. G06Q 30/0275
705/14.43
(Continued)

OTHER PUBLICATIONS

Disclosed Anonymously, "A budget-based policy for operating system scheduling of background tasks", An IP.com Prior Art Database Technical Disclosure, Jun. 5, 2018, 6 pages, Retrieved from the Internet: <https://priorart.ip.com/IPCOM/000254149>.
(Continued)

*Primary Examiner* — Joseph P Hirl
*Assistant Examiner* — Leynna Truvan
(74) *Attorney, Agent, or Firm* — Steven M. Bouknight (57) ABSTRACT

A method for relating different types of records. The method may include providing comparison functions, wherein each comparison function corresponds to a semantical class, and wherein a computational cost is associated with each comparison function. The method may include determining one or more attribute pairs between the different types of records. The method may include sorting the comparison functions according to a determined accuracy. The method may include selecting a set of comparison functions associated with semantical classes according to a predefined rule. The method may include determining a total computational cost based on the computational cost of the selected set of comparison functions. The method may include determining whether two or more records are related using the selected set of comparison functions. The method may include relating the two or more records. The method may include determining a rate of false negative records.

19 Claims, 7 Drawing Sheets

(51) Int. Cl.
*H04L 9/30* (2006.01)
*G06N 5/04* (2023.01)

(56) References Cited

U.S. PATENT DOCUMENTS

| | | |
|---|---|---|
| 2014/0244843 A1 | 8/2014 | Cao |
| 2015/0269383 A1* | 9/2015 | Lang ...................... H04L 63/20 726/1 |
| 2017/0109206 A1 | 4/2017 | Wang |
| 2018/0204111 A1* | 7/2018 | Zadeh .................. G06V 10/764 |

OTHER PUBLICATIONS

Fu, et al., "Optimal Computing Budget Allocation under Correlated Sampling", Proceedings of the 2004 Winter Simulation Conference, 2004 [accessed on Sep. 26, 2019], pp. 595-603, Retrieved from the Internet <https://www.informs-sim.org/wsc04papers/072.pdf>.

Hu, et al., "Efficient Computing Budget Allocation for a Single Design by Using Regression with Sequential Sampling Constraint", Proceedings of the 2012 Winter Simulation Conference, 2012 [accessed on Sep. 26, 2019], pp. 156-167, Retrieved from the Internet: <https://informs-sim.org/wsc12papers/includes/files/con226.pdf>.

Inglesias, et al., "Increasing Task Consolidation Efficiency by Using More Accurate Resource Estimations", Future Generation Computer Systems 56, 2015 [accessed on Sep. 26, 2019], pp. 408-421, Elsevier B.V., IE, Retrieved from the Internet: <http://dx.doi.org/10.1016/j.future.2015.08.018>.

* cited by examiner

| Standardization group | Comparison code | Description |
|---|---|---|
| Name | QXNM | Person - comprehensive |
| Credit Card | DR1D1C | Full - 1 role  1 dimension |
| Gender | EQVD | Alphanumeric |
| DOB | DATE2 | Date or Age |
| Email and Social Media | DR1D1C | Full - 1 role  1 dimension |
| Comparison Group 1 | | |
| Address,Phone | AXP | Address and Phone |
| Geocode | GEO | Geocode |
| Comparison Group 2 | | |
| SSN | DR1D1C | Full - 1 role  1 dimension |
| ID National Identifier | DR1D1C | Full - 1 role  1 dimension |
| ID Tax Identification Number | DR1D1C | Full - 1 role  1 dimension |
| ID Identification Number | DR1D1C | Full - 1 role  1 dimension |
| Business ID | DR1D1C | Full - 1 role  1 dimension |
| Comparison Group 4 | | |
| Driving License | DR1D1C | Full - 1 role  1 dimension |
| Passport | DR1D1C | Full - 1 role  1 dimension |

AUTO-TUNING OF COMPARISON FUNCTIONS

BACKGROUND

The invention relates generally to master data management, and more specifically, to a computer-implemented process for relating a plurality of records to each other.

In business and technical systems, master data management (MDM) is a method used to define and manage data of an organization in a consistent way by using data integration of a single point of reference in a computing system for a real-word entity. One example may be the case of a customer record which may have different attributes in an enterprise resource management system (ERP) than in a customer relationship management system (CRM). In another, more technical example, there may be measurement data of exploration experiments referring to a certain geographical location and a technical description of exploration surroundings having performed exploration experiments. However, in both systems the location and the kind of exploration experiments may have been described differently.

SUMMARY

A method for relating different types of records associated with a plurality of records, with each of the different types of records comprising a plurality of attributes is provided. The method may include providing a plurality of comparison functions, wherein each comparison function associated with the plurality of comparison functions corresponds to a semantical class, and wherein a computational cost is associated with each of the plurality of comparison functions. The method may include based on the plurality of comparison functions, determining one or more attribute pairs between the different types of records. The method may include sorting, for each attribute pair of a selected semantical class, the plurality of comparison functions according to a determined accuracy associated with each of the plurality of comparison functions. The method may include, based on the sorted plurality of comparison functions, selecting a set of comparison functions associated with a plurality of semantical classes according to a predefined rule. The method may include determining a total computational cost based on the computational cost of the selected set of comparison functions. The method may include determining a relationship between two or more records associated with the plurality of records using the selected set of comparison functions. The method may include relating the two or more records based on the determined relationship. The method may include determining a rate of false negative records based on the related two or more records.

A computer system for relating different types of records associated with a plurality of records, with each of the different types of records comprising a plurality of attributes is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include providing a plurality of comparison functions, wherein each comparison function associated with the plurality of comparison functions corresponds to a semantical class, and wherein a computational cost is associated with each of the plurality of comparison functions. The method may include based on the plurality of comparison functions, determining one or more attribute pairs between the different types of records. The method may include sorting, for each attribute pair of a selected semantical class, the plurality of comparison functions according to a determined accuracy associated with each of the plurality of comparison functions. The method may include, based on the sorted plurality of comparison functions, selecting a set of comparison functions associated with a plurality of semantical classes according to a predefined rule. The method may include determining a total computational cost based on the computational cost of the selected set of comparison functions. The method may include determining a relationship between two or more records associated with the plurality of records using the selected set of comparison functions. The method may include relating the two or more records based on the determined relationship. The method may include determining a rate of false negative records based on the related two or more records.

A computer program product for determining whether different types of records associated with a plurality of records are related, with each of the different types of records comprising a plurality of attributes is provided. The computer program product may include one or more computer-readable storage devices and program instructions stored on at least one of the one or more tangible storage devices, the program instructions executable by a processor. The computer program product may include program instructions to provide a plurality of comparison functions, wherein each comparison function associated with the plurality of comparison functions corresponds to a semantical class, and wherein a computational cost is associated with each of the plurality of comparison functions. The computer program product may include program instructions to, based on the plurality of comparison functions, determining one or more attribute pairs between the different types of records. The computer program product may include program instructions to sort, for each attribute pair of a selected semantical class, the plurality of comparison functions according to a determined accuracy associated with each of the plurality of comparison functions. The computer program product may include program instructions to, based on the sorted plurality of comparison functions, select a set of comparison functions associated with a plurality of semantical classes according to a predefined rule. The computer program product may include program instructions to determine a total computational cost based on the computational cost of the selected set of comparison functions. The computer program product may include program instructions to determine a relationship between two or more records associated with the plurality of records using the selected set of comparison functions. The computer program product may include program instructions may relate the two or more records based on the determined relationship. The computer program product may include program instructions to determine a rate of false negative records based on the related two or more records.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

In the context of this description, the following conventions, terms and/or expressions may be used:

The term 'record' may denote an data structure comprising a plurality of elements, attributes or fields, wherein at least a portion of different attributes are of different datatypes. As an example: a customer record may comprise a name (datatype string, fixed length), address (datatype string, fixed length), a street number (datatype integer), ZIP code (datatype integer), contact history (datatype array of strings, variable length), history of orders (datatype array of product numbers, prices, descriptions, . . . ).

The term 'types' may denote here mainly types of records. Two records are of different type if their sequence or datatype of attributes are different to each other. Thus, two records may not be comparable directly because their data structures are different.

The term 'attribute' may denote a portion of a record. Other names for the term attribute may be field of the record or (data) element of the record. The attributes of a record may be of different datatype.

The term 'comparison function' may denote executable software code (which may also be implemented as a functional group implemented in hardware or, a combination of hardware and software) capable of comparing at least two attributes whether they have identical values. The comparison may be performed bit-wise or content-wise. The large variety of comparison functions exists.

The term 'semantical class' may relate to a semantical concept like an address, a date of birth, a person name, etc. and a semantical class may be represented in a physical model with one or multiple attributes, e.g., system 1 may store an address in a single long text attribute, wherein system 2 may store in a sequence of text and integer fields; moreover, system 3 may store the same address as a combination of latitude and longitude coordinates.

The term 'accuracy' may denote the preciseness of a comparison function. Data of the type string may mean the same but may be expressed differently. A simple example may be the name Mayer which may also be written as Meyer, Mayr, Maier, Meyer or the like. However, in reality—even if the name may be written in different forms—it shall identify the same person. In order to determine this, additional data, like, e.g., the related address may be used.

The term 'computational cost' may denote resource requirements, in particular, the amount of computing resources required to perform a specific task. This may be measured in CPU power and CPU time (CPU=central processing unit), storage volumes, network bandwidth and many other quantifiable values related to required computing resources. Additionally, the individual computing resource values may be multiplied with different weighing factors which may vary over time depending on, e.g., the availability. Furthermore, the individual computing resource values may be transformed into some sort of commercial values, in particular, the computing resources may be accessed from a cloud computing center.

The term 'total computational costs' may denote here a combination of individual computing resources (e.g., multiplied with different weighing factors) expressed as a single value such that different total computational costs for different comparison functions or a combination of different comparison functions may be comparable.

The term 'attribute pair' may denote at least two fields are elements in two different records. Thereby, and attribute pair may also denote a sequence of fields or elements if they belong to the same semantical class. For example, an address may comprise the attributes street name, street number, ZIP code, city, country.

The term 'false negative' (FN) may denote an error in data assessment—e.g., as a result of a comparison function—in which a test results improperly indicates no presence of a condition, i.e., the result is negative although in reality it is present. The condition may be an equality of two different attributes and two records. In the context of this document, especially in MDM, if two records are not ideally matched, they will be termed to be false negative. Hence, the 'FN rate' may denote the number of false negatives found out of total records present in a given dataset of records.

The term 'next optimization cycle' may denote here a next loop as part of the proposed method in which a combination of comparison functions may be altered in order to achieve better comparison results and, at the same time, stay within the limits of the predefined computing resources and time.

The term 'importance factor' may denote a value relating to an attribute indicative of a quality of the attribute within a plurality of attributes in a record. The higher the importance factor of an attribute is, the more weight may be assigned to the related comparison function.

The term 'rules engine' may denote a system (implementable as software, hardware or, a combination thereof) capable of applying one or more rules in predefined dependencies for a decision-making, i.e., for determining a predefined outcome for a set of input values. The rules engine may also comprise a rules management system adapted for storing and defining a plurality of rules which combination in application sequence may be configurable. The combination and application sequence may be dynamically adaptable.

The term 'trained machine learning (ML) system' may denote a system capable to perform a specific task (produce an outcome based on a series of input values) without using explicit procedural instructions; instead, the ML system relies on patterns and interference. Machine learning is seen as a subset of artificial intelligence. It may also rely on mathematical models which may convert training data into internal configuration settings of the machine learning system. In case of a given neural network as ML system, the internal configuration settings may be different weights of the different nodes of the neural network. A machine learning system may be denoted as being trained and the internal configuration settings have been adjusted using a plurality of training data to produce a predefined output. Typically, labeled training data are used for such supervised learning.

The term 'encrypted records' may denote a record which attributes may not be available and accessible in plaintext form but in a transformed form which may need a decryption before the attributes may be available for a comparison. However, comparison functions exist that may allow a comparison of records which attributes are at least partially encrypted.

The term 'cross may match' (XNM or QXNM) may denote a comparison function typically used for name matching. It may generally be considered for use in an accurate Anglo-centric datasets.

The term 'global name manager' (GNM or GXNM) may denote a comprehensive multi-cultural name matching comparison function. It is highly accurate and sensitive to the nuances of names in cultures across the world. This comparison function is highly accurate, but computationally intensive.

The term 'pair comparison' may denote an activity or function used to compare "pairs" of candidate records that may be matches. These pairs are compared against each other using an algorithm that is composed of multiple comparison functions, wherein different comparison functions focus on different record attributes, like, name, address, phone number of other alphanumeric identifiers.

In the following, a detailed description of the figures will be given. All instructions in the figures are schematic. Firstly, a block diagram of an embodiment of the inventive computer-implemented method for relating a plurality of records to each other is given. Afterwards, further embodiments, as well as embodiments of the analysis system for relating a plurality of records to each other, will be described.

As previously described, master data management (MDM) is a method used to define and manage data of an organization in a consistent way by using data integration of a single point of reference in a computing system for a real-word entity. One example may be the case of a customer record which may have different attributes in an enterprise resource management system (ERP) than in a customer relationship management system (CRM). In the first exemplary case, it may be an objective of MDM to relate customers in the ERP and CRM system to each other, even if different types of records are used in the different systems. In the second case, it may be an objective of MDM to relate experimental results and locations to each other even if the data has been recorded differently in different systems.

In other words, one goal of MDM is to determine whether two or more records of different types are related to the same entity, and/or the same person, by comparing record attributes using comparison functions. The matching outcomes are driven by an accuracy rate, accuracy of the comparison function(s) in use, and cost in time or required computational costs (e.g., CPU cycles) to achieve desired results.

As such, the present invention may find a relationship between digital records that may be identical but do not have identical information describing the records. Such a problem may be common in enterprise IT systems, however, may be addressed by the present invention and the mastering of master data management (MDM). Specifically, and as previously described, one goal of MDM is to determine whether two or more records of different types are related by comparing record attributes using comparison functions. However, one of the difficulties in trying to find the correct record match may be that a spelling, or more general description of the records, may not be identical in the different systems. As previously described, the matching outcomes are driven by an accuracy rate, accuracy of the comparison function(s) in use, and the cost in time or required computational costs (e.g., CPU cycles) to achieve desired results. As such, users of MDM systems often spend long hours, weeks or even months optimizing their comparison functions' usage patterns to meet their accuracy needs while trying to stay within a given cost profile (resulting in more time, money, or both). Known MDM optimization practices are manual, time-consuming, and static. Furthermore, the cost of switching comparison functions remains relatively high, and in some cases, requiring the reprocessing of supporting standardized data (e.g., comparison strings, bucket memberships) which is a big effort for ever-growing amounts of data.

Therefore, it remains problematic and time-consuming to manually select the right comparison functions for identifying identical records. Thus, it may be advantageous, among other things, to address the ever-growing master data management (MDM) challenges, limit the requirements for high-skilled personnel, and be in compliance with available computing resources.

The proposed computer-implemented method, system, and computer program product for relating a plurality of records to each other may offer multiple advantages, technical effects, contributions and/or improvements.

For example, typically a user may specify the use of multiple comparison functions with different accuracy and computing resources which normally may be translated into different cost profiles. Based on the use of multiple comparison functions with different accuracies, the computer-implemented method, system, and computer program product may determine whether one or more records are related to or match (i.e. is the same as) one or more other records. Furthermore, in response to determining that one or more records may relate to or match one or more other records, the present invention may determine one or more false negative rates associated with the related/matching records. Specifically, the false negative rate may indicate the level of accuracy between the related/matching records. More specifically, a high false negative rate may indicate that a determined relationship or match between records has a low level of accuracy (i.e. the records are more than likely not a match), while a low false negative (FN) rate may indicate that a determined relationship or match between records has a high level of accuracy (i.e. the records are likely a match). However, the comparison function used to yield low FN rates may come at a much higher compute power requirement (i.e. processing time, amounts of required storage/memory) and thus at a much higher cost. Thus, the user may define the FN rate based on a threshold value. The user may also specify upfront an allowed resource consumption, e.g., in the form of a target CPU consumption range or, alternatively, as a cost range. This may be useful if the resources are accessed in a cloud computing model where target CPU consumption time may be available for different costs at different times.

Hence, a more flexible way of relating records to each other may be provided, wherein, at the same time, manual optimization efforts may be reduced which may lead to a faster relationship building of digital entities in MDM systems.

The proposed method, system, and computer program product may also be applied to encrypted records without the need to decrypt the records before their comparison function may be applied. This feature may be based on special comparison functions which may allow a comparison of attributes of records in an encrypted form. Thus, the security of the stored records—e.g., sensitive customer data—may be enhanced.

Currently, specialized personnel may spend hours, weeks or months tuning comparison functions' usage patterns to meet accuracy needs while also reflecting the available cost profile—e.g., either time, money or, both—may be optimized. Efforts for comparison function switching is high because a new configuration effort is required. In some cases, a reprocessing of supporting standardized data (e.g., comparison strings, pocket membership, etc.) may be required. This can be overcome by the proposed solution by allowing enterprises to better manage their digital assets in different enterprise computing systems, like, enterprise resource planning (ERP) systems, supply chain management (SCM) systems, customer relationship management (CRM) systems, analytic systems, simple order entry systems, and the like. Additionally, records in the technical area of CAD/CAM (computer-aided design; computer aided manufacturing) data and other configuration data of complex technical systems may be related to each other more easily.

It may also be noted that typically the cost for improving FN rates is non-linear. The required computing resources—e.g., measured in expenses—may also become more important if one switches from a CAPEX (capital expense) acquisition of hardware to OPEX (operational expense) cloud-based computing resources. Some users may want to spend 200% more CPU cycles to move their FN rate from 89% to 99%. Others may wish to reduce their used CPU cycles by 40% moving from 98% to 95% FN rate. By providing a way to assess the cost of accuracy, one can dynamically adjust the use of comparison functions to grow or reduce the cost footprint as a function of comparison accuracy. This flexibility in terms of freedom of configuration and time savings was previously unavailable in known technologies.

Enterprise users do not need to tolerate the resulting work load footprint implied by a selected, configured comparison function mix, but may actively manage used computing resources and stay—at the same time—within the accuracy requirements for a given use case. This may also reduce latencies in relating records to each other.

It may also be possible at any time to adjust the usage of specific comparison functions under the condition of the variable CPU availability. If the CPU availability is low and equivalent to financially high computing costs, a new optimal set of comparison functions may be selected using a decision engine. On the other side, during peak activity, the decision engine may adjust the target FN rate down to the lowest threshold, specified by the administrator during the configuration of the system.

The proposed computer-implemented method, system, and computer program product may also allow the decision engine to dynamically adjust the preferred comparison functions based on the data locale or the language used; e.g., GNM is the name comparison function that works for different languages, while XNM works only with the English language.

Additionally, based on changes in user's inputs and requirements, a switching of comparison functions might be required. E.g., a privileged user may request elevated accuracy for a specific search, batch search or, analytical job. Consequently, a machine learning system may predict a new optimal set of comparison functions based on a new target FN rate or resource availability. Hence, the here proposed solution may not only make the record relationships easier to identify but may also help—in particular, by a usage of the comparison decision engine—to find in a shorter amount of time optimal comparison functions for a given set of constraints.

According to one embodiment of the method, system, and computer program product, the selection of a set of comparison functions may also comprise starting with the comparison functions that have in their respective semantic class the highest accuracy or the lowest accuracy. Also, other algorithms may be used, in particular the algorithms working with nested intervals.

Also, according to one embodiment, a comparison function with a next lower accuracy—normally, equivalent to less computation costs—or a comparison function with a next higher accuracy may be selected in a next optimization cycle—i.e., a sequence of selecting a set of functions, determining the total computation cost, relating records to each other and determining the rate of false negative records. Due to a typical relationship between a series of comparison functions and the required computing resources, selecting a comparison function with the next lower accuracy means to select a comparison function requiring lesser computing resources that the comparison function used before.

Furthermore, according to one embodiment, at least one comparison function may relate to the semantic class having a highest predefined importance factor. Hence, a predefined importance factor may be defined for a selected comparison during a setup and/or configuration of a related analysis system.

Also, according to embodiment, the selection of a set of comparison functions may also comprise using a rules engine or a trained machine learning system. The rules engine and/or the machine learning system may be equipped with a capability to use a predefined algorithm to a selected next set of comparison functions. In a comparably simple example, the comparison functions to be used may be organized as a list of a predefined sequence.

Additionally, according to one embodiment, the determination of a rate of false negative records may comprise applying the set of comparison function on a test set of records that includes related/matching records of differing types. The test set of records can be labeled so that a result of the used comparison function with the labels can directly lead to the false negative rate.

Also, according to embodiment, at least one record from the different types of records may be encrypted. Thus, typically, the records may have to be decrypted before the usage of the comparison function. However, there may also be another more advanced solution:

Specifically, respective comparison functions may be enabled to relate encrypted records to each other. In this case, the comparison functions may be used that may allow a comparison of fields and/or features and/or attributes of a record in an encrypted form.

The present invention may address data mobility increases and encrypted data matching, where a decision engine (details see below) may be applied. In this context, the present invention may select the optimal public key for encrypting the data. Public keys of larger bit length may ensure more security in a given system, via the cost of computing (i.e., performing encryption) increases exponentially. By having limited/capped resources (e.g., CPU time) and higher security in the system, it may be necessary to come up with a public key which may serve both a purpose in the most optimized manner and a computing resource constraint.

For example, the following may be considered in this context: a set of n keys ($k1, k2, \ldots, kn$) may be given, each of which may have its own encryption costs (in time t1, t2, ..., tn). Additionally, each key may have its own level of security (in terms of time taken for breaching in the system). Thereby, the levels of security are TS1, TS2, ..., TSn. If a desired level of security is TS and the maximum computational costs allowed are T, then the problem is reduced to find a key km such that the costs is tm<=T and the level of security is TSm>=TS. This is a mathematical optimization problem which may be solved with known methods.

According to an embodiment, the steps of selecting a set of functions, determining the total computation cost, relating records to each other and determining the rate of false negative records may be performed as long as a public key for the encryption length does not exceed a predefined length. The comparison functions may be able to compare attributes of encrypted records and may work with public/private encryption key pairs. The longer the length of a public key for a decryption becomes, the more computing efforts are required to perform the comparison function. Thus, the user discussed embodiment may ensure that no unlimited computing resources may be activated in case of using comparison functions allowing a comparison of the attribute of records in encrypted form.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

Figure 1:
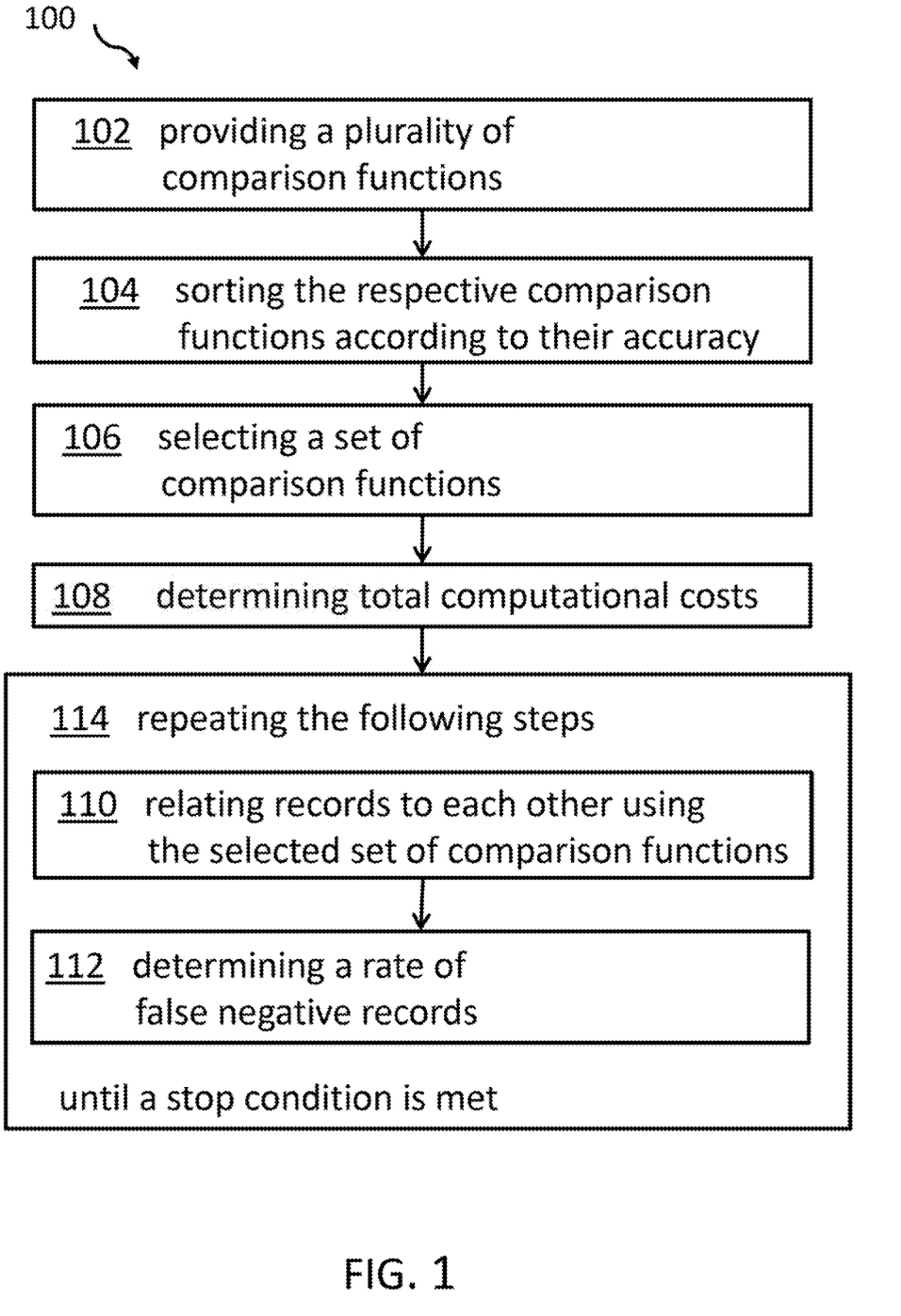
FIG. 1 shows a block diagram of an embodiment of the inventive computer-implemented method for relating a plurality of records to each other.

FIG. 1 shows a block diagram of a preferred embodiment of the computer-implemented method 100 for relating a plurality of records. The records may be different types, e.g., a record in an MDM system, an ERP system and/or an ETL (extract, transform, load) system, a CRM system, a streaming analysis system, etc. Furthermore, the each record may comprise one or more attributes, i.e. have different numbers and/or types of attributes. Also, potentially matching attributes may be different in the records of different types.

The method 100 comprises providing, 102, a plurality of comparison functions. Each comparison function relates to a semantical class which may present a semantical concept as defined above. Additionally, each comparison function has a related accuracy of the comparison results and involves related computational cost.

The method 100 also comprises sorting, 104, for each attribute pair of a selected semantical class, the plurality of comparison functions according to a determined accuracy associated with each of the plurality of comparison functions. This can be predefined during the setup/configuration of the MDM system. Starting with a low accuracy, the required resources may be limited in the beginning of the integrated method. The more iterations that are performed, the more computing resources may be required in order to satisfy the requirements of the comparison functions. However, the method may also start with the highest accuracy for a given group of comparison functions.

Additionally, the method 100 comprises selecting, 106, a set of comparison functions associated with a plurality of semantical classes according to a predefined rule, which may depend on the setup of the MDM system. For instance, the method may start with either the most accurate comparison function, i.e. requiring the highest computational costs, or the least accurate comparison function i.e. requiring lowest computational costs.

Moreover, the method 100 comprises determining, 108, total computational costs, i.e. resource requirements, by adding the computation costs of the selected (and used) comparison functions.

Then a loop process starts, 114, wherein the following two steps are repeated until a stop condition is met and the optimal set of comparison functions is found.

Next, at 110, the present invention may use the selected comparison functions to determine whether records are related. This can be done in all semantic classes and the determination may include determining that records are no-match, clerical (i.e., to be decided by human or a more advanced system), or auto-match. Then, a determination 112 is performed determining a rate of false negative records of the related records.

Figure 2:
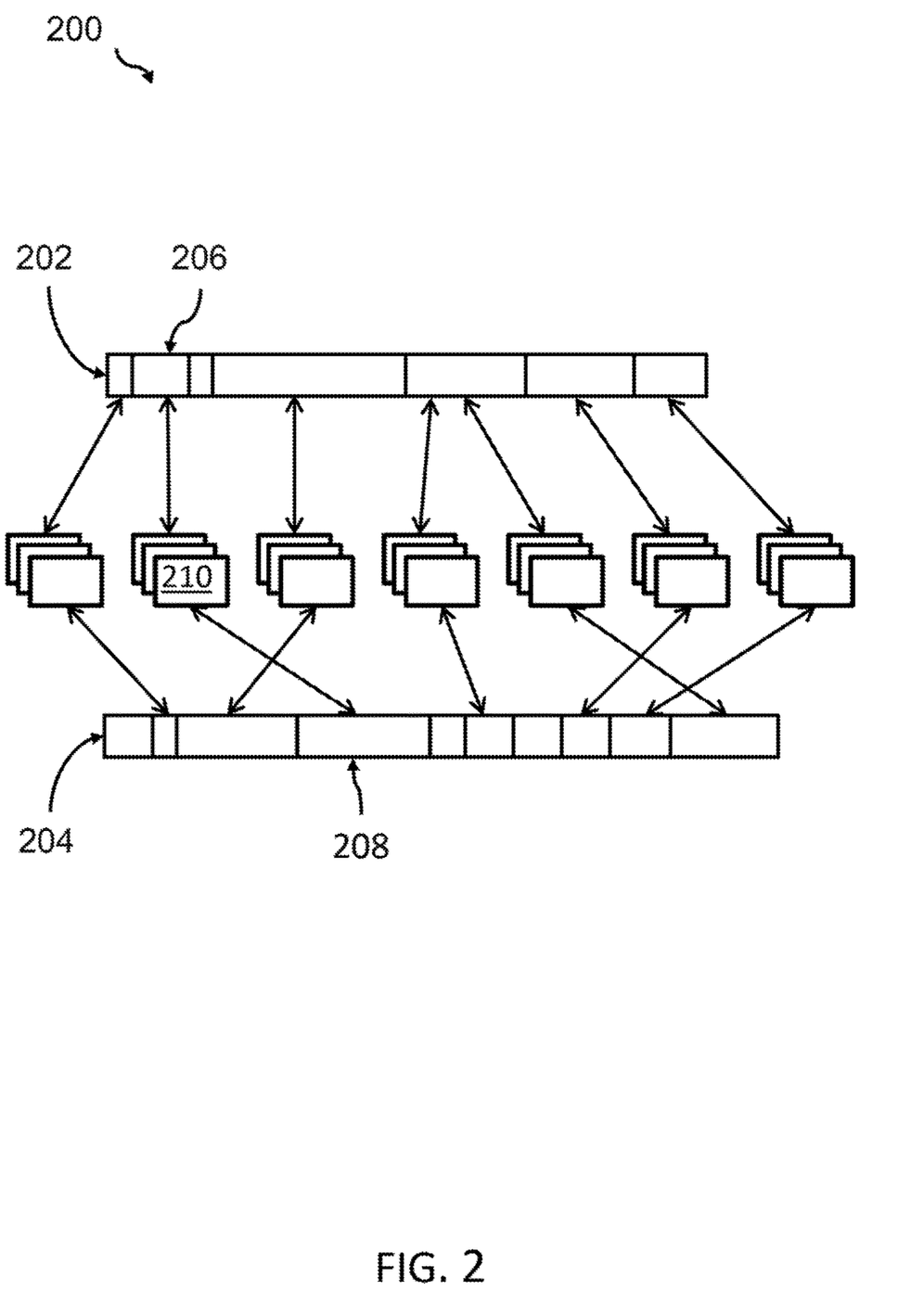
FIG. 2 shows a block diagram of two records of different types with different sets of comparison functions.

FIG. 2 shows a block diagram of two records of different types with different sets of comparison functions. In particular, FIG. 2 shows a block diagram of a first record 202 and a second record 204. Each of the records 202, 204 has a respective structure with attributes 206, 208, one of which is marked with a reference numeral in each of the two records. Additionally, a set of comparison functions 210 is shown, one of which with the respective reference numeral. Although for all attributes three comparison functions are exemplary shown, the number of comparison functions of a semantical class may vary.

In the shown example, the second attribute 206 from the left of the first record 202 is compared to the fourth attribute 208 of the second record 204. During the setup phase of the analysis system or the MDM system, it may have been defined that the attribute 206 and the attribute 208 belong to the same semantical class, i.e., their respective content may be input to respective comparison functions 210. As shown, the position of attributes of the same semantical class may be at different positions, have different sequences in the records to be compared, have different lengths, and/or may be encrypted or not with the same or different encryption methods.

Figure 3:
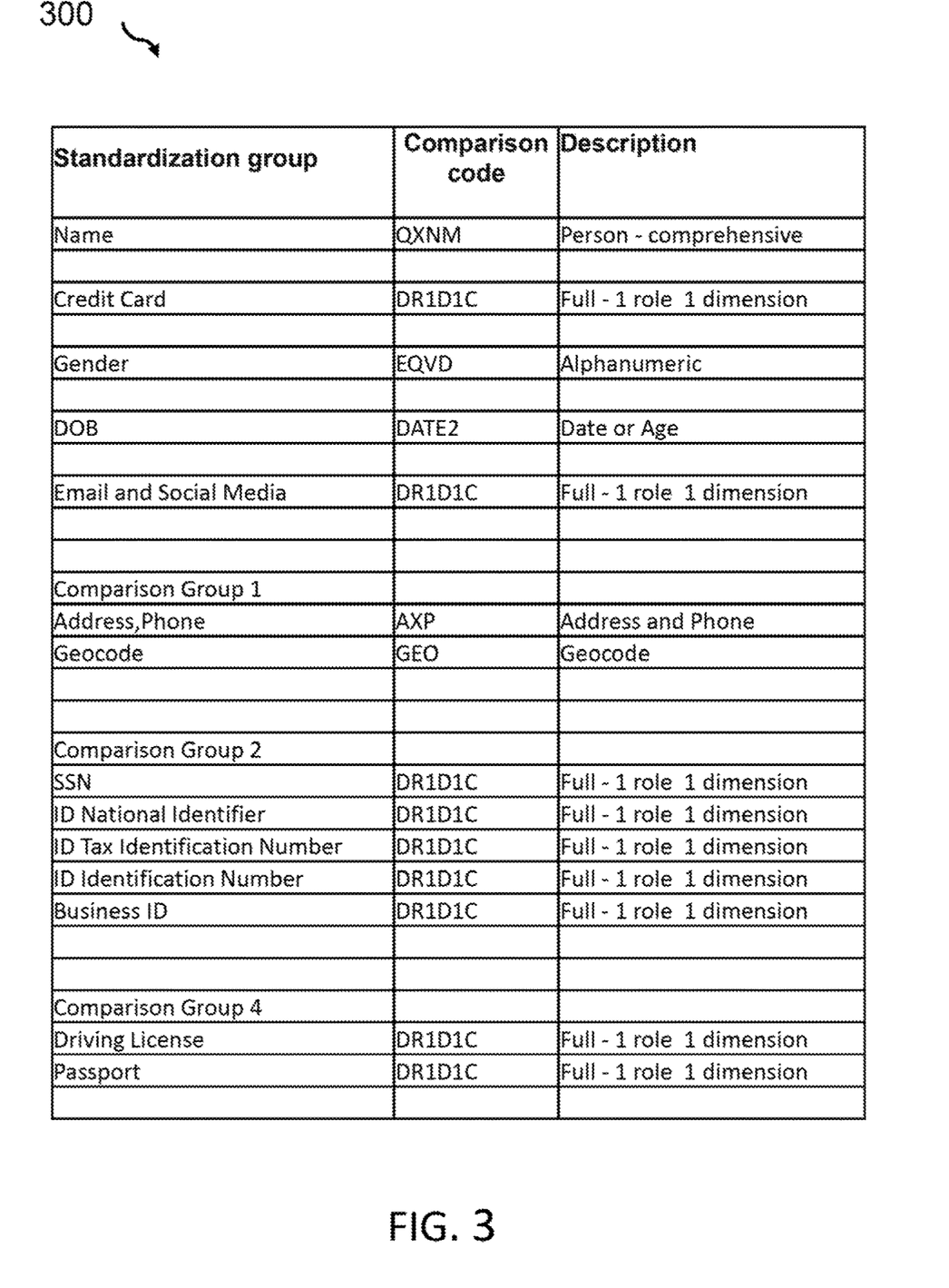
FIG. 3 shows a table with a column for a standardization group, a column for a comparison code or name of a comparison function and a short description.

FIG. 3 shows a table 300 with a column for a standardization group—which may be interpreted as semantical class—a comparison code or name of a comparison function—and a short description in the last column of the table 300. Based on the required accuracy and available resources/time, the execution of the comparison functions may be prioritized. This may be done in different ways to optimize the task of matching/comparing. For example, the execution of the comparison functions may be continued in priority order until an aggregated score exceeds the predefined threshold by a predefined margin. Furthermore, if the accuracy required is comparably high or if a photograph rendering is required, the execution of the comparison function may be kept within the limit of the time spent on the resources used. Additionally, while the execution of the comparison function continues within a selected comparison group, if the selected score reaches a maximum score for that comparison group, other comparison functions in that selected group will not be executed. Thereby, it should be taken into account that using less accurate comparison functions does not mean having a reduction in the quality of the match.

Figure 4:
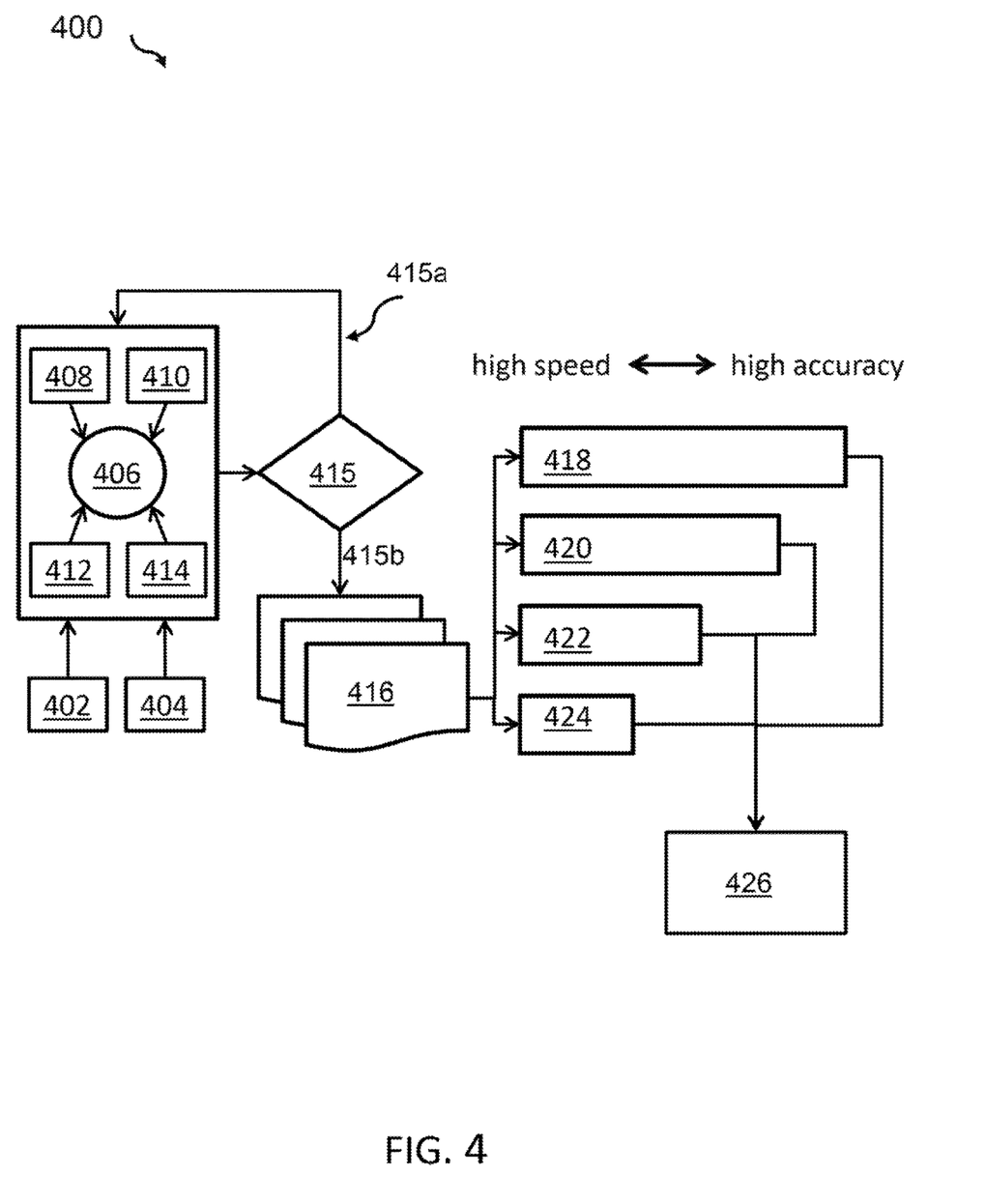
FIG. 4 shows a block diagram of a potential architecture underlying the proposed solution.

FIG. 4 shows a block diagram of a potential architecture 400 underlying the proposed solution. The input interface to the system may either (among others) be an interface 402 which is optimized for bulk processes (bulk input) or a user-driven REST API (Representational State Transfer Application Programming Interface) 404 usable also from other programs. A decision engine 406 utilizes multiple sources of feedback to determine which comparison function(s) should be used at a given time based on available resources and required accuracy rates. Input to the decision engine 406 may be rules 408 established by the administrator during the configuration process, user input 410 (e.g., data stewardship rules) or, automated sources, like machine learning feedback 412 based on prior matching (i.e., analysis data of previous performed record matching processes) or system resource availability 414. Such data may be available from configuration management systems as well as resource monitoring systems (not shown).

The decision engine 406 determines how to score a pair of records by adjusting the complexity of the comparison function(s) in use. According to one embodiment, in which a rapid onset is required (high-speed), the decision engine 406 uses a light-weight comparison function that is optimized for low latency responses but may sacrifice accuracy a bit. In cases, in which latency is less of a concern, or wherein ample computing resources are available, high-accuracy and high-cost comparison functions may be used.

This approach of a decision engine with dynamic scoring strategies allows a generation of an optimal scoring response 426.

The above-mentioned feedback sources typically available to MDM systems may be described as follows: during the configuration process, specific matching functions that meet the accuracy and performance demands may be selected. Federated user accounts may target wider use of comparison functions tailored to specific regional name requirements. On the other side, large-scale commercial users may specify high accuracy pools for transactional security user groups or high-speed comparison profiles for marketing campaigns.

Additionally, machine learning inputs can leverage a variety of MDM sources including automated learning processes from data steward activities, such as manually linking or unlinking records based on current or past algorithm outputs. Alternative comparison functions could be used, where stewards are overriding attribute outcomes more frequently. Furthermore, trained user interfaces that test attribute level comparison function outcomes may be based on the user preference.

Furthermore, users may be enabled to request elevated matching accuracy for specific jobs. Examples for this may include federal users concurrently requesting to launch high-accuracy (i.e., longer runtime) and high-speed (i.e., faster results) comparison functions for stagger rated results.

Furthermore, a variety of system-level monitoring sources may be leveraged to adjust matching accuracy. Examples are system or cluster level utilization metrics, POD-based utilization metrics (a POD basically being a resource pool in cloud computing terminology), and/or user-level locations or resource quotas.

Referring back to FIG. 4, it should be noted that the optimization process is performed in waves or periods. Thus, the determination function 415 loops back to the decision engine 406 for each next period of comparison function selection/optimizations (415a). Alternatively, the decision engine 406 discovers a new optimal comparison profile (decision branch 415b) and dynamically adjusts the assumed runtime. This results in an interval-based decision engine comparison profile 416.

During an execution of this phase, comparison functions are executed which tend to compute resource-wise to the left side (high-speed) or to the right side which stands for high-accuracy (or hyper-accuracy).

Thus, a high-speed scoring/matching/relating process 424 may be used or a high-accuracy, CPU bulk processing queue 418 may be executed. Furthermore, in between, the options for high-speed, CPU uncapped bulk processing queue 420 and hyper-accurate scoring 422 may be presented. Related compute-resource consumption is symbolized by the length of the related boxes 418, 420, 422, 424.

The performance of the decision engine 406 may even be further optimized by an externally executed parallel process that monitors input sources and dynamically adjusts comparison profiles as new tuning information is discovered. This may not be required to run serially but in parallel with inbound traffic (received records to be related to each other), allowing the profiles to be updated dynamically. Furthermore, multiple profiles can be stored based on actual workloads and other user activities.

Figure 5:
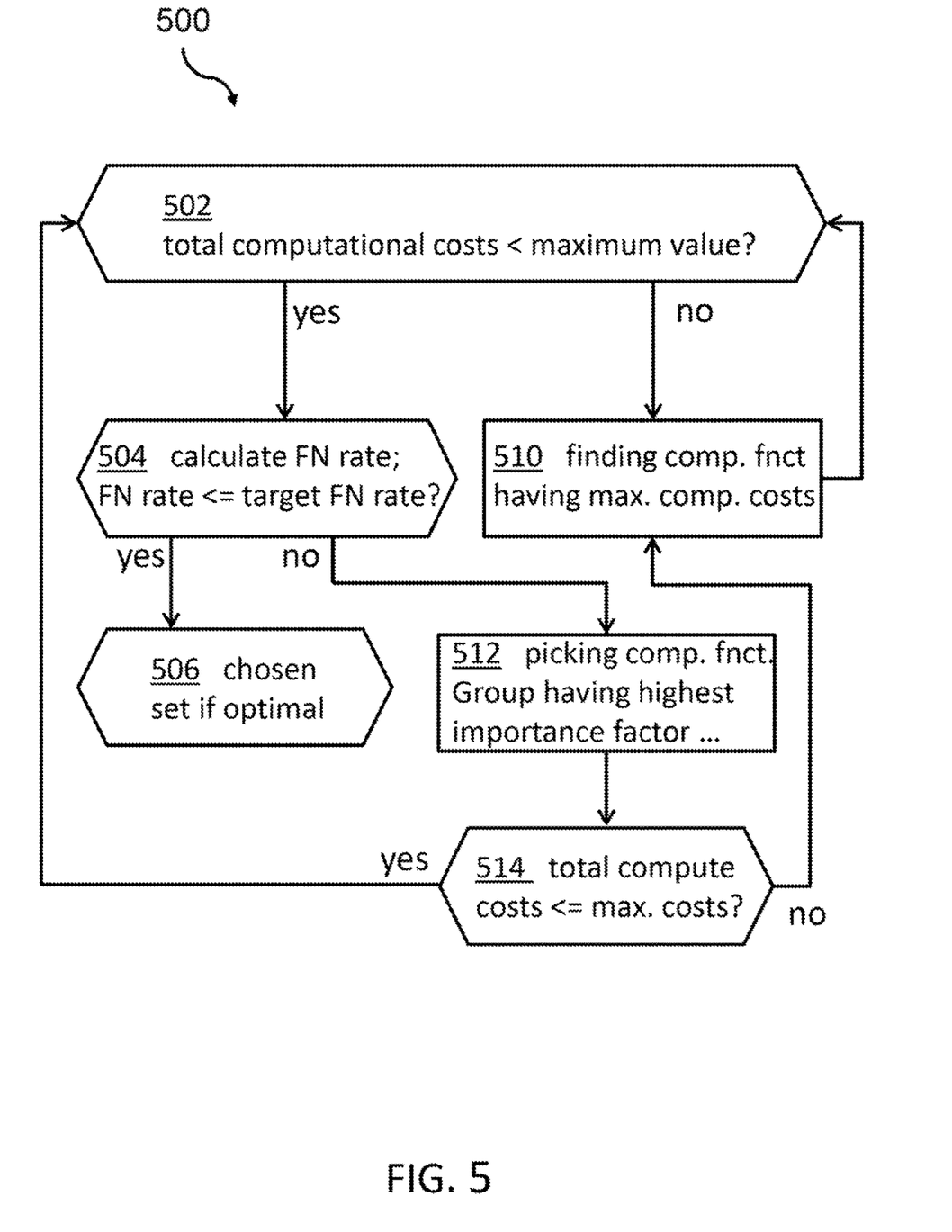
FIG. 5 shows a flowchart of how comparison functions are selected.

FIG. 5 shows a flowchart 500 (or quasi-flowchart) of how comparison functions are selected. This flow chart starts with a determination 502 whether total computing costs have a smaller value than an allowed maximum value of total computing costs.

If that is true—case "yes"—the false negative rate of the recent comparison cycle (using a selected set of comparison functions) is calculated, 504. During the same step 504, it is then determined whether the FN rate is smaller or equal to a target (allowed) FN rate. If that is true—case "yes"—the chosen set of comparison functions is determined, 506, to be an optimal set.

If during the determination 502 whether total computing costs have a smaller than an allowed maximum value of total computing costs is not true—case "no"—the method continues with finding, 510, a comparison function having maximum computational costs and replace it with the next function in the list within the same comparison group (e.g., for the same semantic a class). Then, the process continues with the determination 502.

If during the calculation and determination step 504 (FN rate<=target FN rate?) the outcome is negative—case "no"—the process continues with picking up, 512, the comparison function group having the highest importance factor and choosing a more accurate function from the group (if present); otherwise, continue with the next highest comparison function group.

As a next step in this branch it is determined, 514, whether the total computational costs are smaller or equal the maximum allowed computational costs. If that is not the case—case "no"—the process continues with step 510 of finding that comparison function having the maximum computational cost related to it. If during the determination 514 the outcome is true—case "yes"—the process returns to the determination 504 whether the FN rate is smaller equal the predefined target FN rate.

A prerequisite for the above-described flowchart may be that the comparison functions in a group are arranged according to decreasing (or increasing) order of accuracy. The present invention may also select the first element from each group of comparison functions (i.e., starting with the most accurate one) and construct a respective set of comparison functions. The constructed set of comparison functions may be used as a starting set for the flowchart according to FIG. 5. As such, there may be n different comparison groups (e.g., name, identifier, contact, . . . ), wherein each group may comprise comparison functions of different accuracy and related computational costs.

Figure 6:
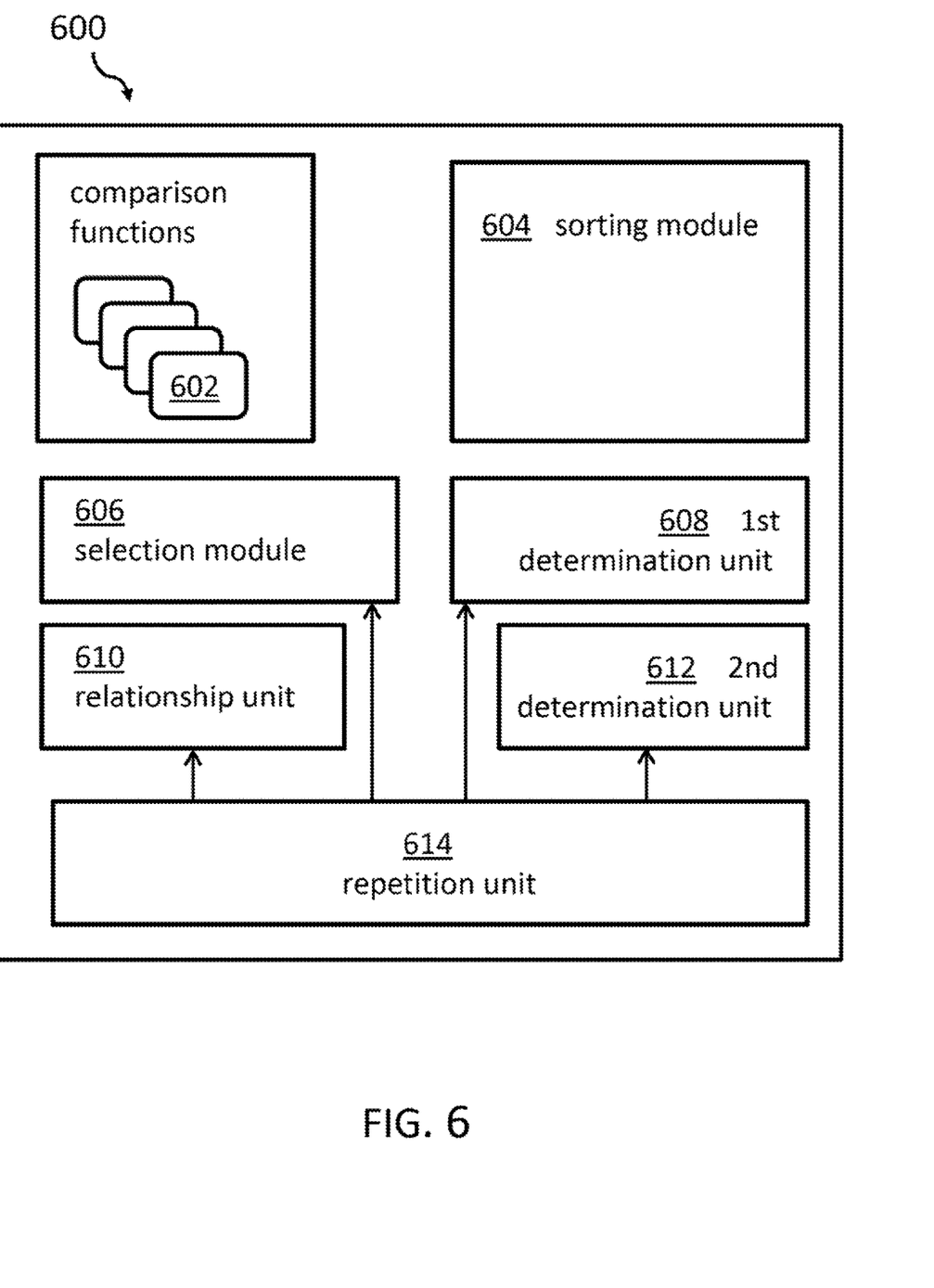
FIG. 6 shows a block diagram of an embodiment of the computer system for relating a plurality of the records to each other.

For completeness reasons, FIG. 6 shows a block diagram of the inventive analysis system 600 for relating a plurality of records to each other. The records may be different types and the records may each comprise a plurality of attributes. The analysis system 600 comprises a plurality of comparison function units 602, wherein each of the comparison function units 602 relate to a semantical class. Each of the plurality of comparison function units 602 has a related accuracy and involves related computational costs.

The analysis system 600—which may also be denoted as a portion of an MDM system—comprises a sorting module 604 for sorting for each attribute pair of a selected semantical class, the plurality of comparison functions according to a determined accuracy associated with each of the plurality of comparison functions, and a selection module 606 for selecting a set of comparison functions for a plurality of selected semantical classes according to a predefined rule.

Furthermore, the analysis system 600 comprises a first determination unit 608 for determining total computational costs by adding the computation costs of the selected comparison functions, a relationship unit 610 for relating records to each other (i.e. determining whether records are a match) using the selected set of comparison function units, and a second determination unit 612 for determining a rate of false negative records of the related records.

Moreover, the analysis system 600 comprises a repetition unit 614 for triggering a repetition of the selection module, the first determination unit, the relationship unit and second determination unit, as long as the total computational costs remain below a predetermined cost threshold value and the determined rate of false negative records remains below a predetermined false negative threshold value.

Figure 7:
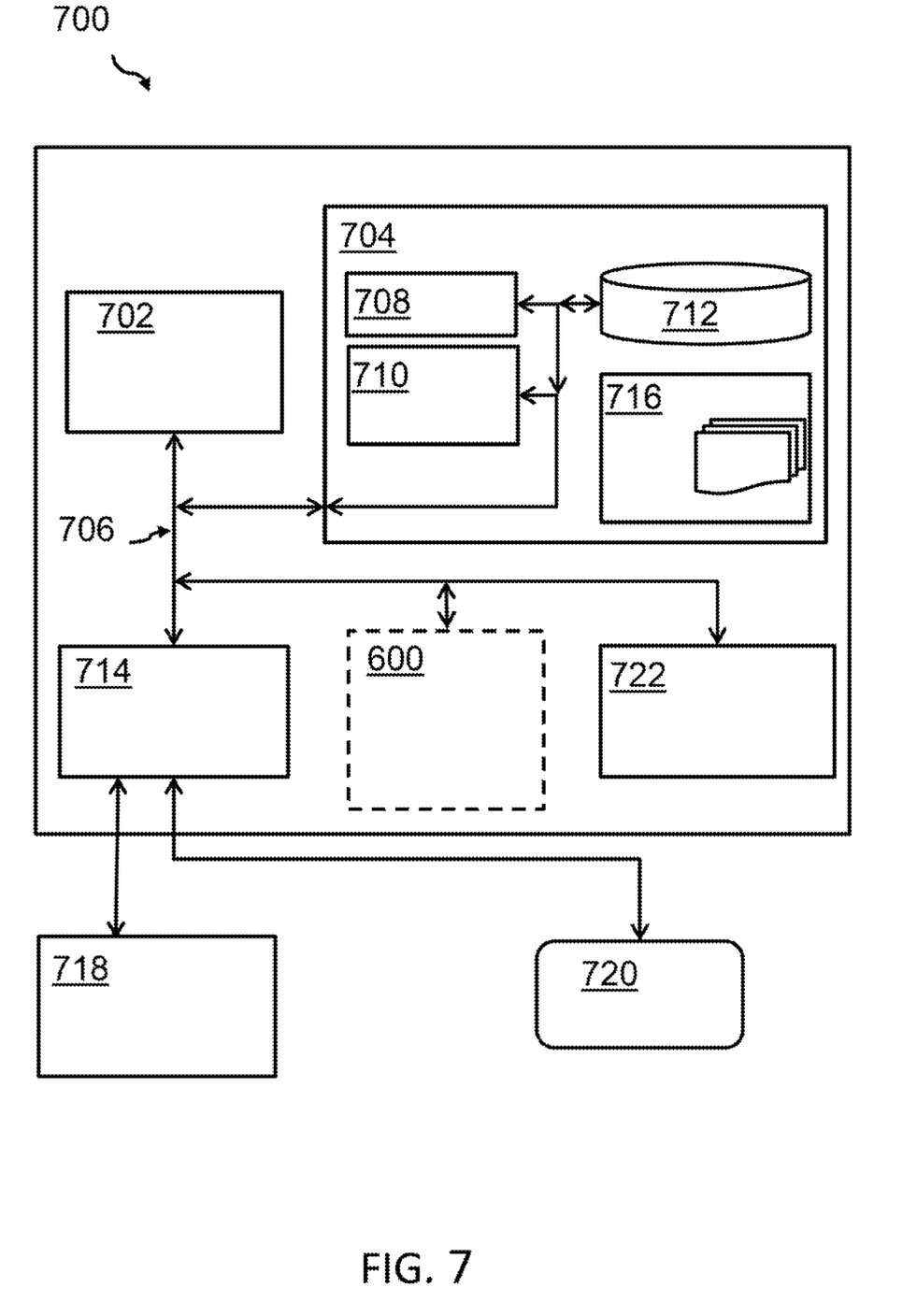
FIG. 7 shows an embodiment of a computing system comprising the analysis system according to FIG. 6.

Embodiments of the invention may be implemented together with on a computer, regardless of the platform being suitable for storing and/or executing program code. FIG. 7 shows an example computing system 700 suitable for executing program code related to the proposed method, system and computer program product.

The computing system 700 is only one example of a suitable computer system and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the analysis system 600 for relating a plurality of records to each other may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for relating different types of records associated with a plurality of records, with each of the different types of records comprising a plurality of attributes, the computer-implemented method comprising:
    providing a plurality of comparison functions, wherein each comparison function associated with the plurality of comparison functions are different, include different accuracies, and corresponds to a semantical class, and wherein a computational cost is associated with each comparison function of the plurality of comparison functions;
    based on the plurality of comparison functions, determining one or more attribute pairs between the different types of records;
    sorting, for each attribute pair of a selected semantical class, the plurality of comparison functions according to a determined accuracy associated with each of the plurality of comparison functions;
    based on the sorted plurality of comparison functions, selecting a set of comparison functions associated with a plurality of semantical classes according to a predefined rule;
    determining a total computational cost based on the computational cost of the selected set of comparison functions, and automatically adjusting the selected set of comparison functions based on the computational cost and specific computing factors, wherein adjusting the selected set of comparison functions further comprises replacing one or more comparison functions in the selected set of comparison functions with one or more new comparison functions;
    determining a relationship between two or more records associated with the plurality of records using the selected set of comparison functions;
    relating the two or more records based on the determined relationship; and
    determining a rate of false negative records based on the related two or more records.

2. The computer-implemented method according to claim 1, wherein selecting the set of comparison functions further comprises:
    selecting the set of comparison functions starting with one or more comparison functions having a highest accuracy or a lowest accuracy in a respective semantic class associated with the plurality of semantical classes.

3. The computer-implemented method according to claim 1, further comprising:
    selecting, in a next optimization cycle for one of the plurality of comparison functions, a comparison function with a next lower accuracy or a comparison function with a next higher accuracy.

4. The computer-implemented method according to claim 3, wherein the one of the plurality of comparison functions relates to the semantic class having a highest predefined importance factor.

5. The computer-implemented method according to claim 1, wherein selecting the set of comparison functions further comprises:
    using a rules engine or a trained machine learning system.

6. The computer-implemented method according to claim 1, wherein determining the rate of false negative records further comprises:
    applying the set of comparison functions to a test set of records comprising related records that include different types of records.

7. The computer-implemented method according to claim 1, wherein at least one record associated with the plurality of records is encrypted.

8. The computer-implemented method according to claim 7, wherein one or more comparison functions are enabled to determine whether encrypted records are related.

9. The method according to clause 8, wherein selecting the set of comparison functions, determining the total computation cost, determining whether two or more records are related, and determining the rate of false negative records is performed as long as a public key for the encryption length does not exceed a predefined length.

10. A computer system for relating different types of records associated with a plurality of records, with each of the different types of records comprising a plurality of attributes, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more computer-readable memories, wherein the computer system is capable of performing a method comprising:
providing a plurality of comparison functions, wherein each comparison function associated with the plurality of comparison functions are different, include different accuracies, and corresponds to a semantical class, and wherein a computational cost is associated with each comparison function of the plurality of comparison functions;
based on the plurality of comparison functions, determining one or more attribute pairs between the different types of records;
sorting, for each attribute pair of a selected semantical class, the plurality of comparison functions according to a determined accuracy associated with each of the plurality of comparison functions;
based on the sorted plurality of comparison functions, selecting a set of comparison functions associated with a plurality of semantical classes according to a predefined rule;
determining a total computational cost based on the computational cost of the selected set of comparison functions, and automatically adjusting the selected set of comparison functions based on the computational cost and specific computing factors, wherein adjusting the selected set of comparison functions further comprises replacing one or more comparison functions in the selected set of comparison functions with one or more new comparison functions;
determining a relationship between two or more records associated with the plurality of records using the selected set of comparison functions;
relating the two or more records based on the determined relationship; and
determining a rate of false negative records based on the related two or more records.

11. The computer system according to claim 10, wherein selecting the set of comparison functions further comprises:
selecting the set of comparison functions starting with one or more comparison functions having a highest accuracy or a lowest accuracy in a respective semantic class associated with the plurality of semantic classes.

12. The computer system according to claim 10, further comprising:
selecting, in a next optimization cycle for one of the plurality of comparison functions, a comparison function with a next lower accuracy or a comparison function with a next higher accuracy.

13. The computer system according to claim 12, wherein the one of the plurality of comparison functions relates to the semantic class having a highest predefined importance factor.

14. The computer system according to claim 10, wherein selecting the set of comparison functions further comprises:
using a rules engine or a trained machine learning system.

15. The computer system according to claim 10, wherein determining the rate of false negative records further comprises:
applying the set of comparison functions to a test set of records comprising related records that include different types of records.

16. The computer system according to claim 10, wherein at least one record associated with the plurality of records is encrypted.

17. The computer system according to claim 16, wherein one or more comparison functions are enabled to determine whether encrypted records are related.

18. The computer system according to claim 17, wherein selecting the set of comparison functions, determining the total computation cost, determining whether two or more records are related, and determining the rate of false negative records is performed as long as a public key for the encryption length does not exceed a predefined length.

19. A computer program product for relating different types of records associated with a plurality of records, with each of the different types of records comprising a plurality of attributes, comprising:
one or more tangible computer-readable storage devices and program instructions stored on at least one of the one or more tangible computer-readable storage devices, the program instructions executable by a processor, the program instructions comprising:
program instructions to provide a plurality of comparison functions, wherein each comparison function associated with the plurality of comparison functions are different, include different accuracies, and corresponds to a semantical class, and wherein a computational cost is associated with each comparison function of the plurality of comparison functions;
program instructions to, based on the plurality of comparison functions, determine one or more attribute pairs between the different types of records;
program instructions to sort, for each attribute pair of a selected semantical class, the plurality of comparison functions according to a determined accuracy associated with each of the plurality of comparison functions;
program instructions to, based on the sorted plurality of comparison functions, select a set of comparison functions associated with a plurality of semantical classes according to a predefined rule;
program instructions to determine a total computational cost based on the computational cost of the selected set of comparison functions, and automatically adjusting the selected set of comparison functions based on the computational cost and specific computing factors, wherein adjusting the selected set of comparison functions further comprises replacing one or more comparison functions in the selected set of comparison functions with one or more new comparison functions;
program instructions to determine a relationship between two or more records associated with the plurality of records using the selected set of comparison functions;
program instructions to relate the two or more records based on the determined relationship; and
program instructions to determine a rate of false negative records based on the related two or more records.

* * * * *